United States Patent
Patel

(10) Patent No.: US 7,818,661 B2
(45) Date of Patent: Oct. 19, 2010

(54) METHOD AND SYSTEM FOR AUTOMATICALLY GENERATING TEMPLATE BASED SPREADSHEET PIVOT TABLES

(76) Inventor: Dilip Patel, 7 Palm Ct., Edison, NJ (US) 08820

( * ) Notice: Subject to any disclaimer, the term of this patent is extended or adjusted under 35 U.S.C. 154(b) by 1050 days.

(21) Appl. No.: 12/157,616

(22) Filed: Oct. 4, 2006

(65) Prior Publication Data

US 2009/0282324 A1    Nov. 12, 2009

(51) Int. Cl.
G06F 17/27    (2006.01)
(52) U.S. Cl. .................................. 715/212; 715/217
(58) Field of Classification Search .............. 715/212
See application file for complete search history.

(56) References Cited

U.S. PATENT DOCUMENTS 6,626,959 B1 * 9/2003 Moise et al. ............... 715/210
2005/0268215 A1 * 12/2005 Battagin et al. ............. 715/503

* cited by examiner

Primary Examiner—Doug Hutton
Assistant Examiner—Tionna Smith
(74) Attorney, Agent, or Firm—Dilip Patel

(57) ABSTRACT

For applications of web-based analytics and business intelligence reporting, methods and systems are provided for exporting a data table as a spreadsheet pivot table by automatic creation of formatted spreadsheet pivot tables with application specific initial views. The views are specified by templates allowing a user to view multiple pivot tables in a single spreadsheet book. Pivot tables are created by a remote server that performs the exporting of the data table so that a user can save the pre created pivot table in his/her local machine. In one embodiment of the invention, the data table on which a pivot table is subject to have a limited number of rows of a spreadsheet data sheet. In another embodiment, the data table on which a pivot table is subject to can exceed the limit of the number of rows of a spreadsheet data sheet.

5 Claims, 5 Drawing Sheets

FIG. 1: Default Discoverer View

| | A | B | C | D | E | F | G |
|---|---|---|---|---|---|---|---|
| 1 | | | | | Bipad | Title | Issue Year |
| 2 | | | | | 10090 | | |
| 3 | | | | | TIME | | |
| 4 | | | | | 2003 | | |
| 5 | | | | | 200310 | | |
| 6 | Wholesaler | Schedule Onsale | Schedule Offsale | Agency Onsale | Detail of US Price | Detail of CAN Price | Detail of Cover Price |
| 7 | 10231--GLENMONT, NY | 03-Mar-2003 | 10-Mar-2003 | 05-Mar-2003 | $3.95 | $4.95 | $3.95 |
| 8 | | 10-Mar-2003 | 17-Mar-2003 | 12-Mar-2003 | | | |
| 9 | | 17-Mar-2003 | 24-Mar-2003 | 19-Mar-2003 | | | |
| 10 | | 26-Sep-2003 | 24-Oct-2003 | 23-Sep-2003 | | | |
| 11 | | 24-Oct-2003 | 21-Nov-2003 | 21-Oct-2003 | | | |
| 12 | | 21-Nov-2003 | 19-Dec-2003 | 25-Nov-2003 | | | |
| 13 | 13437--HARRISBURG, PA | 03-Mar-2003 | 10-Mar-2003 | 04-Mar-2003 | $3.95 | $4.95 | $3.95 |
| 14 | | 10-Mar-2003 | 17-Mar-2003 | 11-Mar-2003 | | | |
| 15 | | 17-Mar-2003 | 24-Mar-2003 | 18-Mar-2003 | | | |
| 16 | | 26-Sep-2003 | 24-Oct-2003 | 30-Sep-2003 | | | |
| 17 | | 24-Oct-2003 | 21-Nov-2003 | 28-Oct-2003 | | | |
| 18 | | 21-Nov-2003 | 19-Dec-2003 | 25-Nov-2003 | | | |
| 19 | 14531--POTSDAM, NY | 03-Mar-2003 | 10-Mar-2003 | 28-Feb-2003 | | | |
| 20 | | | | 03-Mar-2003 | $3.95 | $4.95 | $3.95 |
| 21 | | 10-Mar-2003 | 17-Mar-2003 | 07-Mar-2003 | | | |
| 22 | | | | 10-Mar-2003 | | | |
| 23 | | 17-Mar-2003 | 24-Mar-2003 | 14-Mar-2003 | | | |
| 24 | | | | 17-Mar-2003 | | | |
| 25 | | 26-Sep-2003 | 24-Oct-2003 | 02-Oct-2003 | | | |
| 26 | | 24-Oct-2003 | 21-Nov-2003 | 23-Oct-2003 | | | |
| 27 | | 21-Nov-2003 | 19-Dec-2003 | 27-Nov-2003 | | | |

FIG. 2: A User Defined Default Pivot

| | A | B | C | D | E | F |
|---|---|---|---|---|---|---|
| 1 | Title-Wholesaler Detail Analysis | | | | | |
| 2 | Issue Range - 200310-200312 | | | | | |
| 3 | Schedule Dtasale | [All] | | | | |
| 4 | Scanning Dtsale | [All] | | | | |
| 5 | Agency Dtsale | [All] | | | | |
| 6 | Title | [All] | | | | |
| 7 | Issue Year | [All] | | | | |
| 8 | Bipad | [All] | | | | |
| 9 | | | | | | |
| 10 | | | Data | | | |
| 11 | Wholesaler | Issue code | Detail of Draw | Detail of Sale | Detail of Dealers | |
| 12 | 10231-GLENMONT, NY | 200310 | 28,810 | 14,300 | 2531 | |
| 13 | | 200311 | 28,795 | 12,900 | 2533 | |
| 14 | | 200312 | 28,690 | 13,235 | 2527 | |
| 15 | 10231-GLENMONT, NY Total | | 86,295 | 40,243 | 7591 | |
| 16 | 13437-HARRISBURG, PA | 200310 | 43,285 | 24,025 | 3333 | |
| 17 | | 200311 | 41,475 | 21,525 | 3432 | |
| 18 | | 200312 | 40,150 | 22,917 | 3395 | |
| 19 | 13437-HARRISBURG, PA Total | | 124,910 | 68,467 | 10060 | |
| 20 | 14531-POTSDAM, NY | 200310 | 24,665 | 12,794 | 1635 | |
| 21 | | 200311 | 24,685 | 11,854 | 1666 | |
| 22 | | 200312 | 24,810 | 11,774 | 1686 | |
| 23 | 14531-POTSDAM, NY Total | | 74,160 | 36,422 | 5008 | |
| 24 | 15820-WORCESTER, MA | 200310 | 199,600 | 102,431 | 12229 | |
| 25 | | 200311 | 199,665 | 98,076 | 12414 | |
| 26 | | 200312 | 199,900 | 98,375 | 12431 | |
| 27 | 15820-WORCESTER, MA Total | | 599,265 | 298,985 | 38084 | |
| 28 | 20621-JACKSON, MI | 200310 | 114,145 | 55,905 | 6393 | |
| 29 | | 200311 | 115,640 | 56,135 | 6355 | |
| 30 | | 200312 | 116,640 | 57,190 | 6344 | |
| 31 | 20621-JACKSON, MI Total | | 347,425 | 169,243 | 19012 | |
| 32 | Grand Total | | 1,232,055 | 661,403 | 77658 | |

FIG. 3: A Sample Data File

FIG. 4: A Template Pivot Based on Sample Data

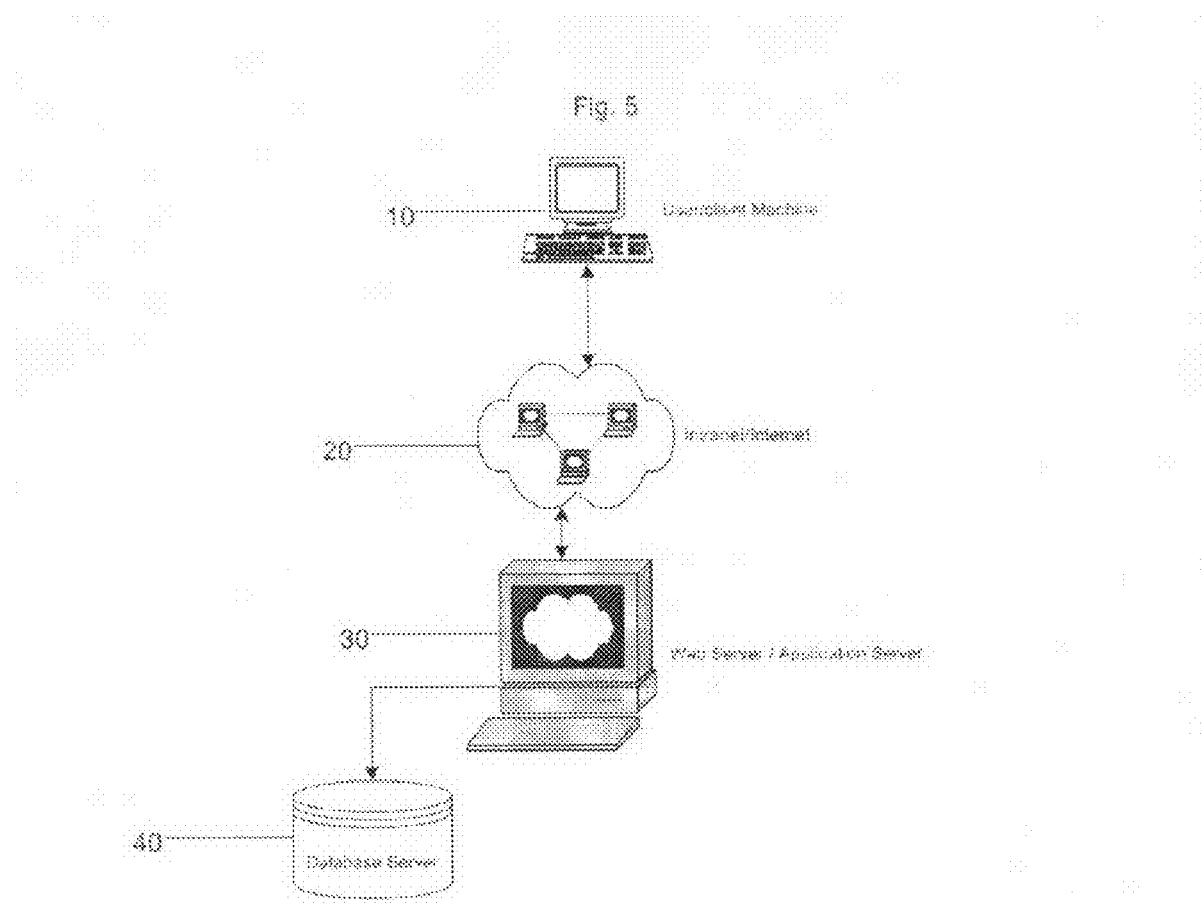
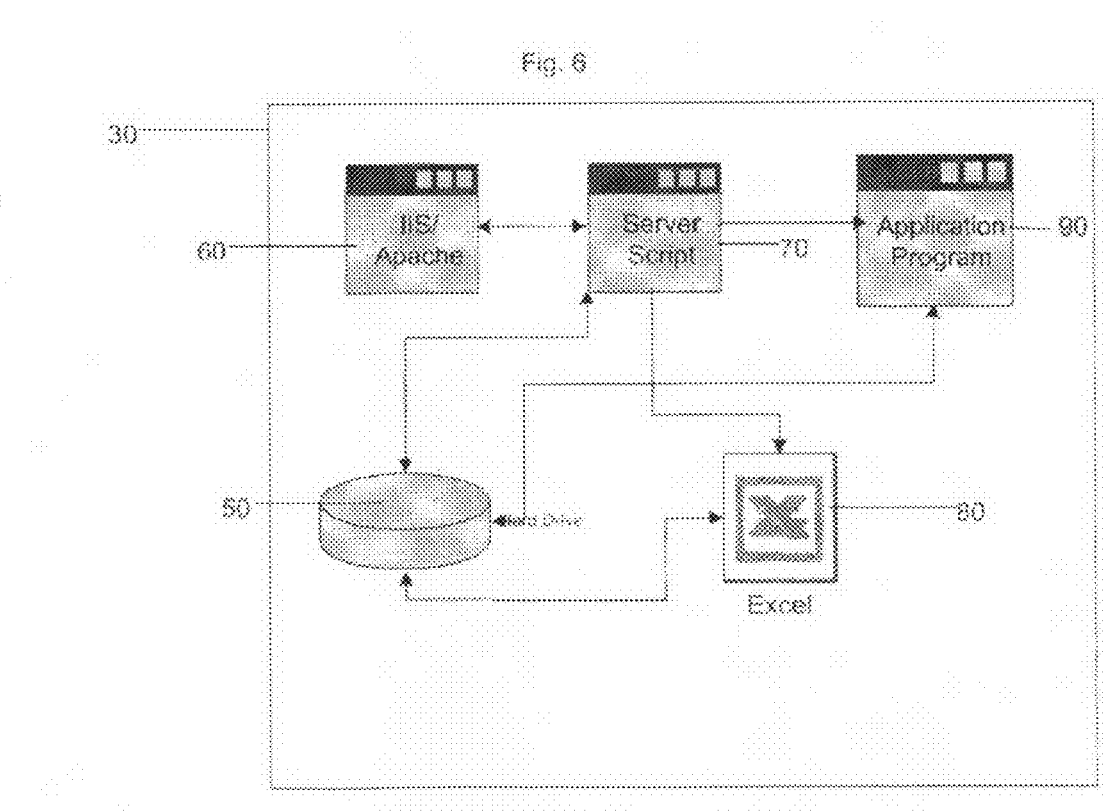

FIG. 7: A Sample Script Producing the Pivot Table

```
'XLoutFileBaseName=""
' Generate a random number to use as part of the text file name
'Randomize
'randomInt = Int((999-101)*Rnd + 100)
'XLoutFileBaseName = "/temp/r"&atro.ID&"_"&index&randomInt&"_data.xls"
XLoutFileBaseName = XLoutFileBaseName1
outFileBaseName = "/statserver"&XLoutFileBaseName
outFileBaseName2 = "/statserver"&XLoutFileBaseName2Link templatefile =
FileSystem.MakePath(Config.WebRoot,"prod_html\MsaTitleIssueComp_template.xls")

outFileFullPath is the xls source file that has data
DIM objXL,objSrcFileXL,objTemplateFileXL
DIM objDataSheetXL DIM xlToRight,xlDown,xlToLeft,xlNormal
xlToLeft = -4159
xlDown = -4121
xlToRight = -4161
xlNormal = -4143

Set objXL = CreateObject ("Excel.Application")

mydate = Now()
str4 = CStr(mydate)
str3 = "Report Created :"
str2 = BipadNames objXL.Visible = true
Set objTemplateFileXL = objXl.WorkBooks.Open(templatefile)
Set objSrcFileXL = objXl.WorkBooks.Open(outFileFullPath)

objTemplateFileXL.Activate
objTemplateFileXL.WorkSheets("DATA").Select
set objDataSheetXL = objTemplateFileXL.WorkSheets("DATA")
objDataSheetXL.Cells.Select
objDataSheetXL.Application.Selection.Delete(xlToLeft)

objSrcFileXL.Activate
set objIPSheetXL = objSrcFileXL.ActiveSheet
ipsheetname=objIPSheetXL.Name objIPSheetXL.Cells.Select
objIPSheetXL.Application.Selection.Copy
objTemplateFileXL.Activate
objTemplateFileXL.WorkSheets("DATA").Select
objTemplateFileXL.ActiveSheet.Paste objTemplateFileXL.Sheets("Title Issue View").Select
objTemplateFileXL.ActiveSheet.PivotTables("PivotTable").RefreshTable
objTemplateFileXL.Sheets("Title Issue View").Cells(3,1) = str1
objTemplateFileXL.Sheets("Title Issue View").Cells(4,1) = str2
objTemplateFileXL.Sheets("Title Issue View").Cells(5,1) = str3
objTemplateFileXL.Sheets("Title Issue View").Cells(5,2) = str4 objTemplateFileXL.Sheets("Wholesaler Title Issue View").Select
'objTemplateFileXL.ActiveSheet.PivotTables("PivotTable2").RefreshTable
'objTemplateFileXL.Sheets("Wholesaler Title Issue View").Cells(3,1) = str1
objTemplateFileXL.Sheets("Wholesaler Title Issue View").Cells(4,1) = str2
objTemplateFileXL.Sheets("Wholesaler Title Issue View").Cells(5,1) = str3
objTemplateFileXL.Sheets("Wholesaler Title Issue View").Cells(5,2) = str4 outputfile = FileSystem.MakePath(Config.WebRoot,XLoutFileBaseName)
objTemplateFileXL.SaveAs(outputfile)
objXl.Quit
```

METHOD AND SYSTEM FOR AUTOMATICALLY GENERATING TEMPLATE BASED SPREADSHEET PIVOT TABLES

BACKGROUND OF THE INVENTION

The present invention relates generally to user interface based analytics, and more particularly, to web-based analytics and business intelligence reports for exporting the output automatically to template based Microsoft EXCEL® pivot tables (cf. http://www.microsoft.com/dynamics/using/excel_pivot_tables_collins.mspx) without subject to the EXCEL® sheet limitation of about 65,000 rows of data.

Presently, the business intelligence systems that produce output in MS Excel Pivot format are limited by the inherent logic of the program that generates them. The current technologies such as Oracle Discover (cf. http://www.oracle.com/technology/products/discoverer/index.html) produce pivot output subject to EXCEL® sheet limitation of about 65,000 rows of data and do not allow desired formats specified through a template.

Moreover, the pivot given by such solutions is of basic format with a default basic view (c.f. FIG. 1), as opposed to initial views &interest (e.g. FIG. 2) that are organized and formatted (e.g. color coding special rows and columns) as desired, thus requiring the users of the report to manipulate the output to obtain the desired views. Furthermore, they do not allow multiple pivots in multiple EXCEL® sheets or insert any new information (headings, etc.) or additional calculations such as row and column summations, that are not present in the sample file, or format the entries as desired. This solution is also not possible when input data resides in a database other than one creating the pivot, as the case in Oracle solution, or when advanced analytics involve in-depth analysis, such as predicted sales and revenues using statistical models, using existing data analytical technologies such as, SAS, SPSS, and SPlus.

DESCRIPTION OF THE INVENTION

To overcome the above and other disadvantages of the prior art, it is desired to provide methods and systems to produce EXCEL® pivots that do not suffer from the inherent logic of the program that generates them. Accordingly, methods and systems are provided to automate the pivot output based on pre-defined templates that are appropriate for individual analytics of interest.

To automatically create EXCEL® pivots when output tables of a web application may involve more than the EXCEL® sheet limitation of about 65,000 rows of data, a sample output data file in ASCII format is placed in a pre-defined folder of the web server being used by the application. The column names of the sample data file is changed to a set of standard names. A template pivot is then developed with data source as the sample text data file and placed in a pre-defined folder. In setting up the template an adequate number of rows are reserved for any actual data specific information including the translation of the standard names to actual names, and any other information that the data file does not provide.

A software program creates the actual output file, with standard column names with the same order of columns and same format as the said sample data file, from an instance of the application, which is to be exported as an EXCEL® pivot table. A Server Side script is developed to populating the template with actual data table to replacing the sample data file in the predefined folder by the actual output data file and to open the EXCEL® template file, and then to refresh the pivot. The script creates a new unique file name and save the refreshed pivot EXCEL® file with the new name in a predefined web server folder.

To handle situations of exporting data tables under EXCEL® sheet limitation of number of rows, with a template based on an EXCEL® data sheet, a Server Side script is developed to select all the cells of the output file and then to copy the data using EXCEL® copy function. The script is extended to select the data sheet in the template file and to paste all the copied cells on to the EXCEL® data sheet cells thus replacing the sample data in data sheet by the actual data.

To provide additional information, including the translation of standard names to actual column names, the said script file is extended to get various information from parameters of html form, a text file created by the said application program, or the script itself. Then the script is extended to write, using EXCEL® cell objects, such information into EXCEL® pivot sheet cells that was reserved during the creation of template file.

When exporting multiple EXCEL® pivot sheets is desired, a template with multiple pivot sheets based on the same or different text data files or data sheets is created. Then the script is extended to copy and paste appropriate data to data sheets or replacing the sample data files used by different pivot sheets and then to refresh each pivot sheet with actual data.

The description of the invention and the following description for carrying out the best mode of the invention should not restrict the scope of the claimed invention. Both provide examples and explanations to enable others to practice the invention. The accompanying drawings, which form part of the description for carrying out the best mode of the invention, show several embodiments of the invention, and together with the description, explain the principles of the invention.

BRIEF DESCRIPTION OF THE DRAWINGS

In the Figures:

FIG. 1 is a sample pivot with basic default view available from such solutions as Oracle Discover;

FIG. 2 is a pivot view of interest to be the default view that is obtained by manipulating the basic pivot given by such solutions;

FIG. 3 is a sample input data of a particular application;

FIG. 4 is a sample pivot template with interested default view;

FIG. 5 is a block diagram of computer devices in which the system works on;

FIG. 6 is a block diagram of computer software and hardware components of the Web Server in which the system works on;

FIG. 7 is a sample script creating a pivot table in a web based analytic.

BEST MODE FOR CARRYING OUT THE INVENTION

Reference will now be made in detail to the preferred embodiments of the invention, examples of which are illustrated in the accompanying drawings. Wherever possible, the same reference numbers will be used throughout the drawings to refer to the same or like parts.

In accordance with an embodiment of the invention, customized automatic pivot creation is performed by a Web Server 30 in FIG. 5 when requested by a user 10 in FIG. 5 running a web-based analytic over the internet or an intranet 20 of FIG. 5. The automatic creation of a customized EXCEL® pivot for user desired data that resides in a database 40, or processed and analyzed data produced from such data, is implemented by a server side script that resides on the web server 30 in FIG. 5. The invention is implemented in 2 different ways depending on the size of the data file that is used by Microsoft EXCEL® pivot.

In this embodiment, the user requested data file is expected to have less then 65,000 records, and hence a sample output data file of tabular Microsoft EXCEL® format with standard column names, as illustrated by FIG. 3, is pre created. Using the sample file, a Microsoft EXCEL® pivot template file with desired view and format, as illustrated by FIG. 4, and as described by such publications as "Excel Pivot Tables and Pivot Charts Your visual blueprint for creating dynamic spreadsheets" by Paul McFedries, Wiley, 2006, is also created. One can set the default view and create more then 1 pivot sheet from the data sheet to show various output views. The template file, as illustrated by FIG. 4, is stored on a network drive or on the web server's hard drive 50 in FIG. 6, which is accessible by the server side script 70 in FIG. 6. Next step is to create a script file that can open EXCEL® and then open the template file and the data file into EXCEL®. Using EXCEL® commands, replace the sample data sheet of the template file with the actual user requested data. Then script file use EXCEL® commands to refresh the pivot and to save the EXCEL® file with a randomly generated file name. This file is saved on the web server's hard drive in a folder that is accessible through the web server.

In another embodiment of the invention, when a user requested data file is expected to contain more then 65 thousand records, the web analytic generating the output data file is set be of text format. Then using Microsoft EXCEL® option, a pivot table is created using an ODBC file drive to read data from an ASCII file of tabular text format, instead of reading data from an EXCEL® sheet. A sample text file of tabular format is pre created with standard column names and saved in a pre specified location of the hard drive 50 of FIG. 6. In producing a pivot table with this text file, Microsoft creates a schema.ini file. This file along with the EXCEL® pivot template file are also stored on a network drive or on the web servers hard drive 50 of FIG. 6, which is accessible by the server side script 70 of FIG. 6. Next step is to create a script file that opens EXCEL®, and then opens the EXCEL® template file and call EXCEL® refresh command. The pivot would read user requested data from a text file which can be created by the script or an application program that is invoked by the script.

In each of the above 2 embodiments, a server script file, such as the one illustrated by FIG. 7, is created to perform EXCEL® and functionalities described above and is saved on the web server. It is invoked by an html or through another other script file. The server side script file is created using standard methods described and disclosed in such publications as "Windows 2000 Scripting Bible", by William R. Stanek, IDG Books, 2000. Depending on the expected number of rows of the output table, the script could either create the EXCEL® data file or a ASCII data file using data from any file or database system using ODBC or other API's. The script could also invoke other scripts or applications that could run high end analytics and in turn generate a data file in the format needed by the template file. The script also provides and writes on the EXCEL® pivot table any information specific to the current application of the web analytic and any necessary translation of standard names in the sample data file into names appropriate in the current application.

What is claimed is:

1. A method for exporting a data table as a pivot table comprising the steps of:
   setting up a sample ASCII data file of tabular text format;
   translating actual column names of the ASCII data file to a set of standard column names;
   placing the said sample ASCII data file in a predefined folder of a web server that performs the exporting of the data table;
   setting up a pivot table template with a data source specified to be the said sample ASCII data file;
   reserving a set of rows in the pivot table template for the translation of the actual column names of the ASCII data file to the set of standard column names;
   saving the pivot table template the predefined folder.

2. The method of claim 1, wherein the step of populating the template with actual data comprises the step of:
   writing a software program to produce an output with the said standard column names in the same order of the actual column names and same format as the sample ASCII data file;
   writing or updating script that can be invoked, by a client web page or web application, to:
     replace the sample ASCII data file in the predefined folder by the output file;
     create a server side spreadsheet object, which is used to open the pivot template, then to select the pivot table and refresh the pivot table;
     create a new unique file name of the pivot table and to save the refreshed pivot file with the new name in the predefined folder; and
     close the spreadsheet object.

3. A method for exporting data tables as pivot tables comprise the step of:
   setting up a template pivot file which has a predefined pivot table that uses a sample data sheet in the said template pivot file;
   placing the said template pivot file in a predefined folder of a web server performing the exporting of the data tables;
   writing software programs and scripts to perform steps of claim 2;
   extending the script to select all cells of an output file and copy data using spreadsheet copy function;
   extending the script to select the sample data sheet in the template pivot file and to paste all the copied cells on to the spreadsheet data sheet cells thus replacing the sample data with actual output data.

4. The method of claim 1 or 3, further comprising the steps of providing additional information, including the translation of the actual column names of the ASCII data file to the set of standard column names:
   extending the script to get additional information from parameters of a hypertext markup language (HTML) form, a text file created by an application program, or the script itself, wherein the additional information includes the translation of the actual column names of the ASCII data file to the set of standard column names, some of the parameter values obtained from the HTML form, and report creation date obtained from the script itself;
   extending the script to write, using spreadsheet cell objects, the additional information into pivot sheet cells that was reserved during the creation of template pivot file.

5. The method of claim 1 or 3, further comprising the step of exporting multiple pivot tables from data tables comprise the steps of:
- setting up pivot template with multiple pivot tables based on the same or different text data files or data tables;
- extending the script to perform steps of claim 1 or 3 based on the input data file or data tables, that would create spreadsheet object and perform steps from claim 1 or 3 to copy the data to a table or replacing the sample ASCII data files that are used by different pivot tables;
- extending the script to select each pivot table using spreadsheet Select function and then refresh the pivot table on the selected spreadsheet by using a spreadsheet pivot refresh function.

* * * * *